Patented May 15, 1951

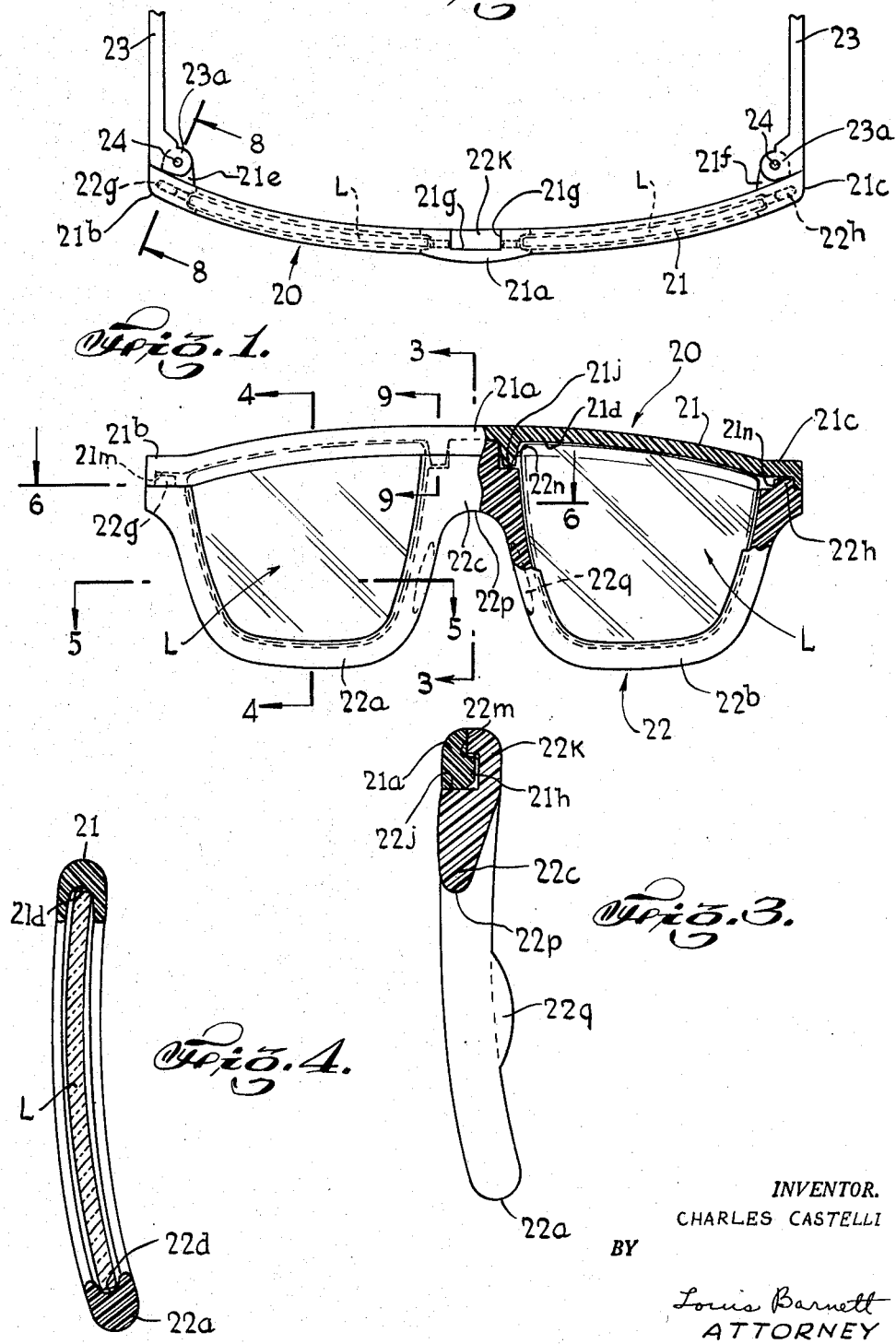

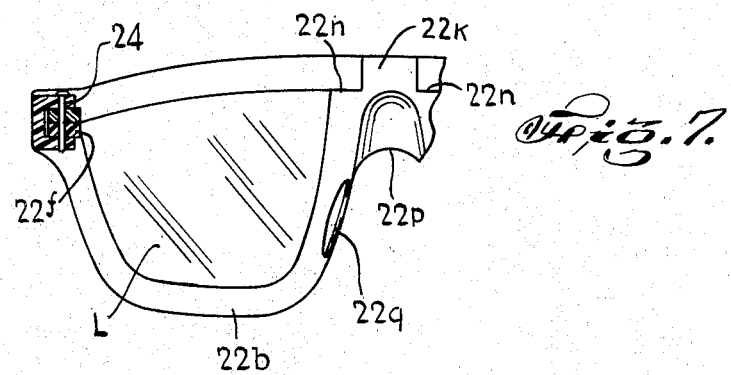
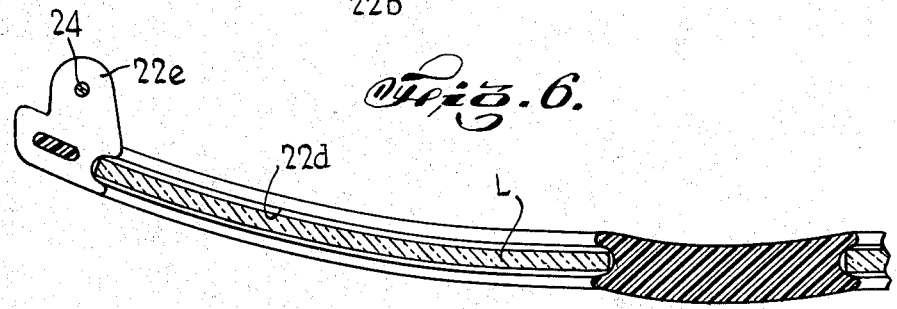
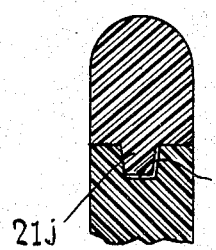
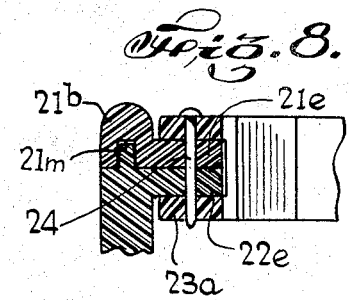

2,553,496

UNITED STATES PATENT OFFICE 2,553,496

EYEGLASS FRAME CONSTRUCTION

Charles Castelli, Union City, N. J., assignor to Columbia Protektosite Co. Inc., Carlstadt, N. J., a corporation of New Jersey Application July 1, 1948, Serial No. 36,341

4 Claims. (Cl. 88—41)

This invention relates to eyeglass frame constructions, and more particularly is directed to such improved construction utilizing an assembly of plastic molded parts, such for example, as forming sunglasses and the like.

Among the objects of the invention is to generally improve eyeglass frame constructions of the character described which shall comprise few and simple parts that are readily assembled to provide a rugged structure to withstand rough usage without requiring supplemental reinforcements, which shall be pleasing in appearance and facilitate forming different appealing effects, which shall be cheap to manufacture, which shall permit easy mounting of lenses therein, and which shall be efficient and practical to a high degree in use.

Other objects of the invention will in part be obvious and in part hereinafter pointed out.

The invention accordingly consists of features of construction, combination of elements and arrangements of parts which will be exemplified in the construction hereinafter disclosed, the scope of the application of which will be indicated in the claims following.

In the accompanying drawing in which one embodiment of the invention is shown,

Fig. 1 is a front elevational view of the eyeglass frame construction embodying the invention, shown partly broken away to expose the assembly.

Fig. 2 is a top plan view of the eyeglass frame construction shown in Fig. 1, ends of the temple bars being shown broken short.

Figs. 3, 4, 5 and 6 are enlarged detail cross-sectional views taken on lines 3—3, 4—4, 5—5 and 6—6, respectively, in Fig. 1.

Fig. 7 is a fragmentary view of the rear side of the eyeglass frame construction shown in Fig. 1, the temple bar being shown broken away at the hinge, and Figs. 8 and 9 are enlarged detail cross-sectional views taken on line 8—8 through the hinge in Fig. 2 and on line 9—9 through the nose bridge in Fig. 1 respectively.

In the embodiment of the invention shown in the drawings and hereinafter described, 20 denotes a complete eyeglass frame construction as adapted for use as sun goggles or the like.

As seen from Figs. 1 and 2, said frame construction may be formed of a two part lens mounting comprising an elongated bar 21 which may be made of molded plastic material and when worn normally extends downward from the forehead of the wearer at about the level of the eyebrows and across the bridge of the nose in the well understood manner, and a double lens carrier 22 which supports and retains desired shaped lenses L in position with relation to the eyes of the wearer. Said carrier 22 may be formed of molded plastic material as an integral unit having U-shaped rim portions 22a and 22b spaced apart by nose bridge interconnecting portion 22c, said rim portions 22a and 22b each being constructed to extend partially the peripheral border of lens L fitted therein.

Double lens carrier 22, as seen from Figs. 1, 2, 4 and 6 has each of the U-shaped rim portions 22a and 22b thereof provided with an internal groove 22d in which each of spaced apart lenses L is seated, outer opposite ends of said rim portions 22a and 22b having rearwardly extending hinge tabs 22e and 22f, respectively, and upstandingly aligning ridges or tongues 22g and 22h, respectively, said tabs 22e, 22f and tongues 22g, 22h being integrally formed with the structure carrier 22.

Nose bridge interconnecting portion 22c of lens carrier 22 may be formed with a top front cutback section 22j so constructed and arranged to provide an upstanding ledge 22k having a recess 22m in a front side thereof, and a pair of spaced apart cross grooves 22n on either side of said ledge 22k, as seen from Figs. 1, 2, 3 and 7. In the nose opening 22p of said portion 22c rearwardly extending nose pad supports 22q may be provided as shown in Figs. 3 and 7.

Elongated bar 21 as seen from Fig. 1 may be symmetrically formed to have a slight curvature, a midportion 21a and aligned ends 21b and 21c, said bar 21 being bowed to conform to the contour of the wearer's forehead and so as to mate in assembly with similarly shaped double lens carrier 22. The bar ends 21b and 21c have integral rearwardly extending hinge tabs 21e and 21f, respectively, which in the assembly are superimposed on said hinge tabs 22e and 22f to provide a substantial anchorage for pivoted bifurcated ends 23a of temples 23, as is clear from Figs. 7 and 8.

Bar midportion 21a has the centrally disposed section thereof formed with a recess 21g positioned and shaped to accommodate ledge 22k in flush relation with an extending portion 21h projecting into said recess 22m as seen in Fig. 3, and is also provided with spaced apart downwardly extending projections 21j which neatly fit into said cross grooves 22n as shown in Figs. 1, 2 and 7. Said bar 21 may also be provided with spaced grooves 21d which extend from the midportion 21a toward the ends 21b and 21c and are positioned to align with grooves 22d of carrier 22. Spaced grooves 21d terminate in narrowed portions 21m and 21n in ends 21b and 21c and are shaped to receive the aligned ridges or tongues 22g and 22h of carrier 22, respectively, as seen in Figs. 1, 2 and 8.

Temples 23 which also may be molded of plastic material have said ends 23a thereof formed to swingably embrace combined hinge tabs 21e, 22e, and 21f, 22f for pivoting movement on suitable pins 24 as shown in Figs. 2, 7 and 8.

With the parts constructed as described above and shown in the drawing, the bar 21 can readily be assembled to lens carrier 22 by first fitting lenses L in grooves 22d and positioning bar 21 so that grooves 21d thereof completely enclosed the peripheral borders of said lenses L.

In so positioning bar 21, spaced apart projections 21j are first inserted in cross grooves 22n as shown in Fig. 1 and ledge 22k sprung into bar midportion recess 21g with bar extending portion 21b fitted into recess 22m. The ledge 22k will then interlock with bar midportion recess 21g, the respective ends 21b, 21c and hinge tabs 21e, 21f of said bar 21 being superimposed on mating ends of lens carrier 22 and hinge tubs 22e, 22f thereof. Bar extending portion 21h as thus assembled fits into recess 22m, tongues 22g, 22h of the carrier 22 fit into narrowed portions 21m and 21n of grooves 21d, and spaced apart projections 21j fit into cross grooves 22n thereby further securing the parts together as is clear from Figs. 1, 2 and 3.

If desired a suitable adhesive may be provided on all contacting surfaces of the interfitted assembly to more firmly retain the same together.

After securing the lens L in place between bar 21 and carrier 22, temple ends 23a are secured into pivoting position by pins 24, said temple ends 23a serving to embrace said mated tabs, retaining said bar 21 and carrier 22 in an effective interlocked rigid structure as shown in Figs. 7 and 8.

It will thus be apparent that ledge 22k forms a novel interlocking joint with bar midportion 21a through the engagement of bar extending portion 21h with recess 22m to retain bar 21 and carrier 22 at said midportion against separation in a vertical plane, while spaced projections 21j and cross grooves 22n form a tongue and groove joint to retain the parts against displacement in a horizontal plane. The bar 21 and carrier 22 are similarly held against vertical displacement at each end by the bifurcated end 23a of temple 23 embracing the combined hinge tabs 21e, 22e and 21f, 22f, respectively, with the tongue 22g, 22h and grooves 21m, 21n, respectively, retaining the parts against displacement in a horizontal plane.

It will thus be seen that there is provided an eyeglass frame construction whereby the several objects of this invention are achieved and which is well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described my invention, I claim as new and desire to secure by Letters Patent:

1. An eyeglass frame construction of the character described comprising a one-piece double carrier having U-shaped lens rim fitting portions spaced apart by an integrally formed nose bridge, an elongated bar shaped to extend over said carrier and formed with grooves for receiving an upper rim of each of the lenses, opposite ends of said bar and carrier having mating hinge tabs, and interlocking means for securing in assembly said carrier nose bridge with a midportion of said bar, said interlocking means including an integrally formed ledge extending vertically from said nose bridge and positioned in flush relation in a recess formed in the bar midportion, said ledge having a recess receiving an extension of the bar midportion for interlockment against displacement in a vertical plane.

2. The eyeglass frame construction defined in claim 1 in which said interlocking means includes a tongue and groove in said bar midportion and said nose bridge, respectively, on each side of said ledge for retention against displacement in a horizontal plane.

3. An eyeglass frame construction of the character described comprising a one-piece double lens carrier having U-shaped lens rim fitting portions spaced apart by a nose bridge integrally formed therewith, an elongated bar extending over said lens carrier formed with a mid-portion and spaced apart grooves for receiving an upper rim of each of the lenses, opposite ends of said bar and carrier having mating hinge tabs, an integrally formed ledge upstanding from said nose bridge having a recessed portion, said bar mid-portion having a recess for positioning the ledge in a flush relation therein, a portion of said bar extending into said ledge recessed portion for interlocking the carrier and bar against vertical displacement, and a tongue and groove interconnection between said bar mid-portion and nose bridge for retention thereof against horizontal displacement.

4. An eyeglass frame construction having a two-piece lens mounting comprising an elongated curved and bowed bar having a midportion formed to be worn at the level of the eyebrows and across the bridge of the nose of a wearer, a one-piece double carrier having U-shaped lens rim fitting portions spaced apart by an integrally formed nose bridge, opposite ends of said bar and carrier each having integrally formed tongue and groove interlocking portions and mating hinge tabs, temples each formed with a bifurcated end to embrace said mating hinge tabs, a pin extending through each of said temple ends and mating hinge tabs for mounting the temples in effective position and retaining said bar and carrier ends in interlockment, said carrier nose bridge and the midportion of said bar being integrally formed with interlocking portions constructed and arranged to positively retain said carrier nose bridge and said bar midportion by coaction in interlocking relation against separation in both vertical and horizontal planes when free from adhesive thereat.

CHARLES CASTELLI.

REFERENCES CITED

The following references are of record in the file of this patent:

UNITED STATES PATENTS

| Number | Name | Date |
|---|---|---|
| 308,344 | Collins | Nov. 25, 1884 |
| 989,218 | Wells | Apr. 11, 1911 |
| 1,235,842 | Reagan | Aug. 7, 1917 |
| 2,380,281 | Whipple | July 10, 1945 |

FOREIGN PATENTS

| Number | Country | Date |
|---|---|---|
| 579,861 | France | Aug. 14, 1924 |